Patented Aug. 12, 1924.

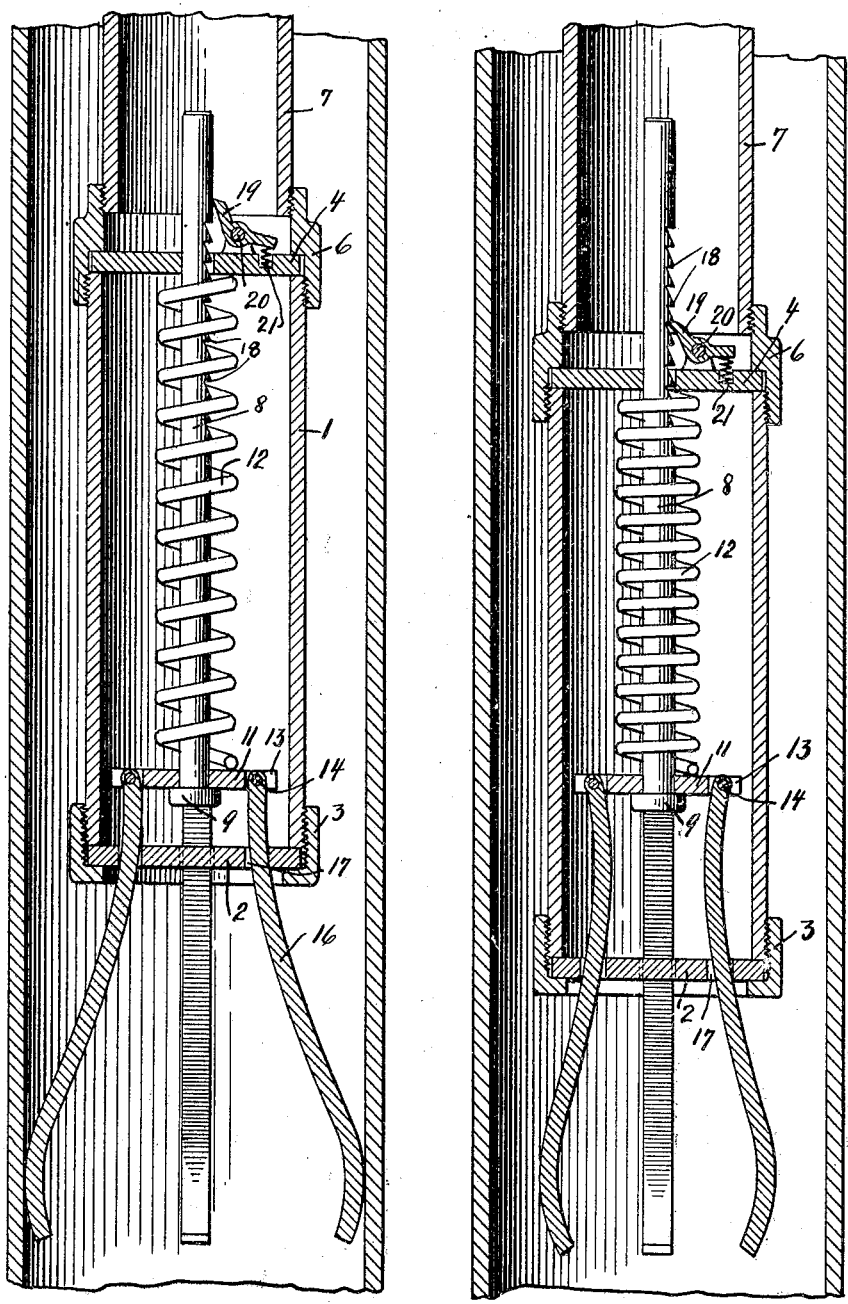

1,504,648

UNITED STATES PATENT OFFICE.

CHARLES P. SKINNER, OF BICKNELL, CALIFORNIA, ASSIGNOR OF ONE-THIRD TO HENRY SCHWAB AND ONE-THIRD TO J. A. DUNN, BOTH OF BICKNELL, CALIFORNIA.

GRIPPING DEVICE.

Application filed October 19, 1922. Serial No. 595,630.

*To all whom it may concern:*

Be it known that I, CHARLES PAGE SKINNER, a citizen of the United States, and a resident of Bicknell, county of Santa Barbara, State of California, have invented a new and useful Gripping Device, of which the following is a specification.

The present invention relates to improvements in gripping devices adapted to be used in deep wells for the purpose of gripping objects that may have been dropped into the well as a tool or a piece of a drilling bit. A particular object of the invention is to provide a device for this purpose that is very simple in its construction, exercises a strong gripping effect and works automatically. Further objects and advantages of my device will appear as the specification proceeds.

The preferred form of my invention is illustrated in the accompanying drawing in which Figure 1 shows my gripping device in the well casing in the position in which it is lowered into the casing while Figure 2 shows the same device in its gripping position. While I have shown only the preferred form of the invention it should be understood that various changes or modifications may be made within the scope of the claims hereto attached without departing from the spirit of the invention.

My device comprises a cage (1) cylindrical in form closed at the bottom by the plate (2) held in place by the flanged sleeve (3) threadedly engaging the lower marginal portion of the cylinder and at the top by the plate (4) held in place by the threaded sleeve (6). The cage may be handled by any suitable means as by the pipe (7) connecting with its top.

A vertical rod (8) extends centrally through the top plate into the cage terminating at its bottom in the head (9) on which rests a preferably circular plate (11) normally forced away from the top plate by the spring (12) coiled on the rod. The plate (11) is provided with a plurality of evenly distributed radial slots (13) in which are supported pins (14) pivotally engaging the upper ends of a plurality of jaws (16) which latter extend through perforations (17) in the bottom plate of the cage downwardly. The jaws are curved so that when the cage slides down on the same they will move toward each other in a radial direction so as to close in on an object surrounded by them. Normally the jaws are held apart by the action of the spring (12) and when thus arranged they preferably make contact with the wall of the casing. If however the jaws after having been lowered into the casing strike the bottom of the well and are stopped from further advance by the same, further pressure brought to bear on the cage by the operator will cause the same to ride downwardly on the jaws and cause the latter to firmly engage the object to be picked up.

It will be noticed that the rod (8) is provided with a plurality of ratchet teeth (18) adapted to be engaged by a dog (19) pivotally mounted on the top plate of the cage as shown at (20) and forced into engagement with the teeth by the spring (21). When the cage rides downwardly on the jaws the dog simultaneously rides downwardly on the teeth and when the cage has reached its most downward position the dog will lock the same in this position due to the action of the spring (21).

The operation of the device should be readily understood from the foregoing description. Assuming that a tool, a piece of a drilling bit or the like is to be picked up from the bottom of the well, the cage is lowered until the jaws (16) strike the bottom. Due to the action of the spring (12) the jaws are maintained, during the downward travel in contact with the wall of the casing or the hole underneath the casing so that the object to be picked up is surrounded by the same. The striking of the bottom causes the jaws to stop and when the downward pressure is continued the cage rides down on the jaws and forces the same together until the object to be picked up is firmly held between the jaws. The dog (19) at the same time rides downwardly over the teeth (18) and locks with one of the teeth when the cage has reached its lowermost position so that now the operator may pull the cage upward and the lost object with the same.

I claim:

1. A gripping device comprising a plurality of cooperating jaws movable to occupy gripping or non-gripping position, means for yieldably urging the jaws to non-gripping position, and means operating automatically to lock the jaws in gripping position when moved to such position.

2. A gripping device comprising a cage, a plurality of co-operating jaws projecting from and movable in the cage, means on the cage for causing the jaws to occupy gripping position when moved inwardly of the cage and to occupy non-gripping position when moved outwardly thereof, yieldable means for urging the jaws outwardly of the cage, and means operating automatically to lock the jaws in gripping position when moved to such position.

3. A gripping device for use in wells comprising a member, a plurality of jaws movable in and projecting from the member and adapted to abut the bottom of a well when the device is lowered into the well, means for causing the jaws to normally occupy non-gripping position to receive an object in the well, means for causing the jaws to occupy gripping position when they reach the bottom of the well and downward movement of the cage is continued, and means operating to automatically lock the jaws against relative movement when they reach gripping position whereby the object is secured by the jaws to permit lifting of the object with the device from the well.

CHARLES P. SKINNER.